(12) United States Patent
Voelkel et al.

(10) Patent No.: US 10,920,864 B2
(45) Date of Patent: Feb. 16, 2021

(54) PLANETARY GEARING SYSTEM, IN PARTICULAR REDUCTION GEAR WITH INTEGRATED SPUR GEAR DIFFERENTIAL

(71) Applicant: Schaeffler Technologies AG & Co. KG, Herzogenaurach (DE)

(72) Inventors: Franz Voelkel, Nuremberg (DE); Manfred Götz, Memmelsdorf (DE); Ralph Schimpf, Fürth (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 93 days.

(21) Appl. No.: 16/326,266

(22) PCT Filed: Jul. 31, 2017

(86) PCT No.: PCT/DE2017/100636
§ 371 (c)(1),
(2) Date: Feb. 18, 2019

(87) PCT Pub. No.: WO2018/046041
PCT Pub. Date: Mar. 15, 2018

(65) Prior Publication Data
US 2019/0211908 A1 Jul. 11, 2019

(30) Foreign Application Priority Data
Sep. 6, 2016 (DE) .......................... 102016216784.7

(51) Int. Cl.
*F16H 57/08* (2006.01)
*F16H 48/11* (2012.01)
(Continued)

(52) U.S. Cl.
CPC ........... *F16H 37/082* (2013.01); *F16H 48/11* (2013.01); *F16H 48/40* (2013.01); *F16H 57/082* (2013.01);
(Continued)

(58) Field of Classification Search
CPC ........ F16H 48/40; F16H 48/11; F16H 57/082; F16H 2048/106
See application file for complete search history.

(56) References Cited

U.S. PATENT DOCUMENTS 3,527,121 A * 9/1970 Moore .................. F16H 57/082
475/338
3,772,939 A 11/1973 Hause
(Continued)

FOREIGN PATENT DOCUMENTS

DE 7401523 U 5/1975
DE 10049564 A1 4/2001
(Continued)

*Primary Examiner* — Ernesto A Suarez
*Assistant Examiner* — Lillian T Nguyen
(74) *Attorney, Agent, or Firm* — Reid Baldwin

(57) ABSTRACT

An integrated planetary gearing system includes a reduction gear and a spur gear differential. First planets are arranged in a first planet plane. Second planets are arranged in a second planet plane. A planetary carrier includes a first carrier wall section, a second carrier wall section, and a third carrier wall section. The first and the second carrier wall section are spaced apart from one another axially and are formed by a base part. The third carrier wall section is formed by a cover element which is attached to the base part. The second carrier wall section carries a plurality of pockets, each receiving a planet of the second toothing plane. The cover element is attached to cover seat faces of the pocket bottoms, which cover seat faces in each case face away from the pocket interior.

14 Claims, 2 Drawing Sheets

(51) Int. Cl.
    *F16H 48/10*     (2012.01)
    *F16H 37/08*     (2006.01)
    *F16H 48/40*     (2012.01)
    *F16H 1/28*     (2006.01)

(52) U.S. Cl.
    CPC ............... *F16H 2001/2881* (2013.01); *F16H 2048/106* (2013.01)

(56) References Cited

U.S. PATENT DOCUMENTS

| | | | |
|---|---|---|---|
| 2005/0192152 A1* | 9/2005 | Kimes | F16H 57/082 475/331 |
| 2010/0184552 A1 | 7/2010 | Soybel et al. | |
| 2011/0053730 A1* | 3/2011 | Fox | F16H 57/082 475/347 |
| 2011/0275477 A1* | 11/2011 | Hsieh | F16H 57/082 475/331 |
| 2012/0083375 A1* | 4/2012 | Lo | B62M 6/65 475/149 |
| 2015/0045170 A1 | 2/2015 | Ohmura et al. | |
| 2015/0377334 A1* | 12/2015 | Swales | F16H 48/10 475/220 |

FOREIGN PATENT DOCUMENTS

| | | |
|---|---|---|
| DE | 102005006649 A1 | 9/2005 |
| DE | 102012222223 A1 | 6/2014 |
| DE | 102015110040 A1 | 12/2015 |
| DE | 102015214035 A1 | 1/2017 |

\* cited by examiner

PLANETARY GEARING SYSTEM, IN PARTICULAR REDUCTION GEAR WITH INTEGRATED SPUR GEAR DIFFERENTIAL

CROSS-REFERENCE TO RELATED APPLICATIONS

This application is the U.S. National Phase of PCT Appln. No. PCT/DE2017/100636 filed Jul. 31, 2017, which claims priority to DE 10 2016 216 784.7 filed Sep. 6, 2016, the entire disclosures of which is incorporated by reference herein.

TECHNICAL FIELD

The present disclosure relates to a planetary transmission configured as a reduction gear mechanism with an integrated spur gear differential. In particular, the disclosure relates to a planetary transmission in which a carrier includes a base part having a first and second carrier wall, the second carrier wall defining a number of pockets, and a cover fastened to the pockets and forming a third carrier wall.

BACKGROUND

DE 10049564 A has disclosed a planetary transmission of this type. In the case of said known transmission, the planetary carrier is composed of a base element and a cover which is attached to it. The base element forms pockets, in which the planets of a first planetary set are seated. The planets of the second planetary set are seated in an intermediate space between the base element and the attached cover. The coupling of the cover to the base element takes place by way of webs which are configured integrally with the base element and bridge the second toothing plane.

DE 740 15 23 U has disclosed a planetary carrier for a planetary transmission, which planetary carrier likewise supports planets in two toothing planes, the planetary carrier being configured in such a way that, as a single-piece component, it forms three walls which follow one another axially and in each case carry planet journals.

SUMMARY

The disclosure is based on the problem of providing a planetary transmission, the planets of which are advantageously supported radially, and which planetary transmission is distinguished by a robust, compact construction which can be realized inexpensively.

According to the disclosure, said problem is solved by way of a planetary transmission, having:
first planets which are arranged in a first planet plane,
second planets which are arranged in a second planet plane, and
a planetary carrier with a first carrier wall section, a second carrier wall section, and a third carrier wall section,
the first and the second carrier wall section being spaced apart from one another axially and being formed by way of a base part, and the third carrier wall section being formed by way of a cover element which is attached to the base part,
the second carrier wall section carrying a plurality of pockets which are spaced apart from one another in the circumferential direction, have in each case one pocket wall which extends axially in the second toothing plane, and are closed off by way of radially extending pocket bottoms in an end region which faces away from the first carrier wall section,
a planet of the second toothing plane being received in the respective pocket, and
the cover element being attached to cover seat faces of the pocket bottoms, which cover seat faces in each case face away from the pocket interior.

As a result, it advantageously becomes possible to provide a planetary transmission, in the case of which the geometries which are decisive for the positioning of the planets of the first and the second toothing plane can be configured on a single, highly rigid integral part, and favorable rolling conditions on the spur gears which are in engagement with one another result even under high load torques.

In accordance with one embodiment, the first and the second planets are mounted on planet journals which are then received in bores of the base part with a tight fit. Here, the planets may be seated via anti-friction bearings, in particular needle bearings on said planet journals.

The planetary transmission may be configured in such a way that the first carrier wall section, the second carrier wall section, the pocket walls and the pocket bottoms are formed by way of an integral part. Here, said integral part is in turn preferably manufactured from a cast material, in particular a spheroidal graphite cast steel material. As an alternative to this, it is also possible, however, to manufacture said integral part as a forged component, or else as a welded component, for example from a plurality of sheet metal molded parts.

According to one embodiment, the base part is configured in such a way that the respective pocket bottom forms a receiving bore, in which a corresponding section of a planet journal is seated.

In accordance with one aspect, it is possible for the respective planet journal to be of extended configuration such that, on a side which faces away from the pocket interior, it is elevated above the cover seat face which is formed by way of the pocket bottom, the cover element then receiving the projection of the respective planet journal by way of a corresponding locating bore. This results in precise positioning of the cover element and highly loadable torque-proof coupling of the cover element to the base part. In addition, the cover element also makes a contribution to the rigidity in the case of the support of those sections of the planet journals which are seated in the pocket bottoms.

In accordance with a further aspect, it is possible to configure the planetary transmission in such a way that the second toothing plane accommodates the components of a spur gear differential gear mechanism in an intermediate region which lies between the pockets. This results in a particularly advantageous way in the possibility of bringing about a power branch from the planetary transmission in that toothing plane, in which a torque increase is brought about via the second planets. Here, a sun gear of the spur gear differential gear mechanism can be situated between the pocket bottoms at the same axial level as the latter. Said installation space region can thus also be used to realize a high part density. The cover element which is attached to the pocket bottoms then closes off the second toothing plane.

The pockets may be configured in such a way that each of the pockets forms a U-shaped structure in radial section, the planet which is received therein then being a spur gear, the toothing of which is exposed in sections toward the circumferential region of the base part. Said planet can then engage, for example, radially from the inside into an internal gear which extends in the second toothing plane and engages around the planetary carrier coaxially with respect to the latter.

A particularly high basic transmission ratio of the planetary transmission can be achieved in an advantageous way by the planet which is received in the respective pocket being coupled fixedly to a planet which is arranged coaxially in the first toothing plane so as to rotate with it. The first planet which is arranged in the first toothing plane preferably has a greater rolling circle diameter than the second planet. Here, the first and the second planet can be designed as a multi-step planet which is then either manufactured as a single-piece planet or is joined together from two individual gears which are coupled fixedly to one another so as to rotate together.

The cover element can advantageously be designed in such a way that it provides a bearing bore, for receiving a bearing device which is concentric with respect to the circulating axis of the planetary carrier. A shaft which is coaxial with respect to the bearing axis or a sun gear can then be supported radially in said bearing device. The planetary carrier can also be supported radially via said cover element.

In accordance with a further aspect, it is also possible to design the cover element in such a way that it provides a toothing system on the outer circumference, which toothing system makes it possible to also realize a parking lock gear via the cover element, which parking lock gear can be fixed in a switchable manner via a latching member.

Two planetary sets are provided in the case of the planetary transmission. Said planetary sets are mounted jointly in the planetary carrier, but are arranged next to one another in the adjoining first and second toothing planes which follow one another axially, a planetary set of the first toothing plane also overlapping into the second toothing plane and being in a toothing operative connection with the other planetary set there. In the case of the planetary transmission, the planetary carrier forms at least one pocket for one of the overlapping planetary gears, and the bottom of said pocket at the same time has an eye, for mounting the journal of said overlapping planetary gear. The journal protrudes axially beyond the eye of the pocket bottom which acts as a web, and protrudes into a further eye of the cover element. The planetary gear which overlaps the two toothing planes can be designed, in particular, as a multi-step planet or as a "long" planet.

BRIEF DESCRIPTION OF THE DRAWINGS

Further details and features result from the following description in conjunction with the drawings, in which.

DETAILED DESCRIPTION

Figure 1:
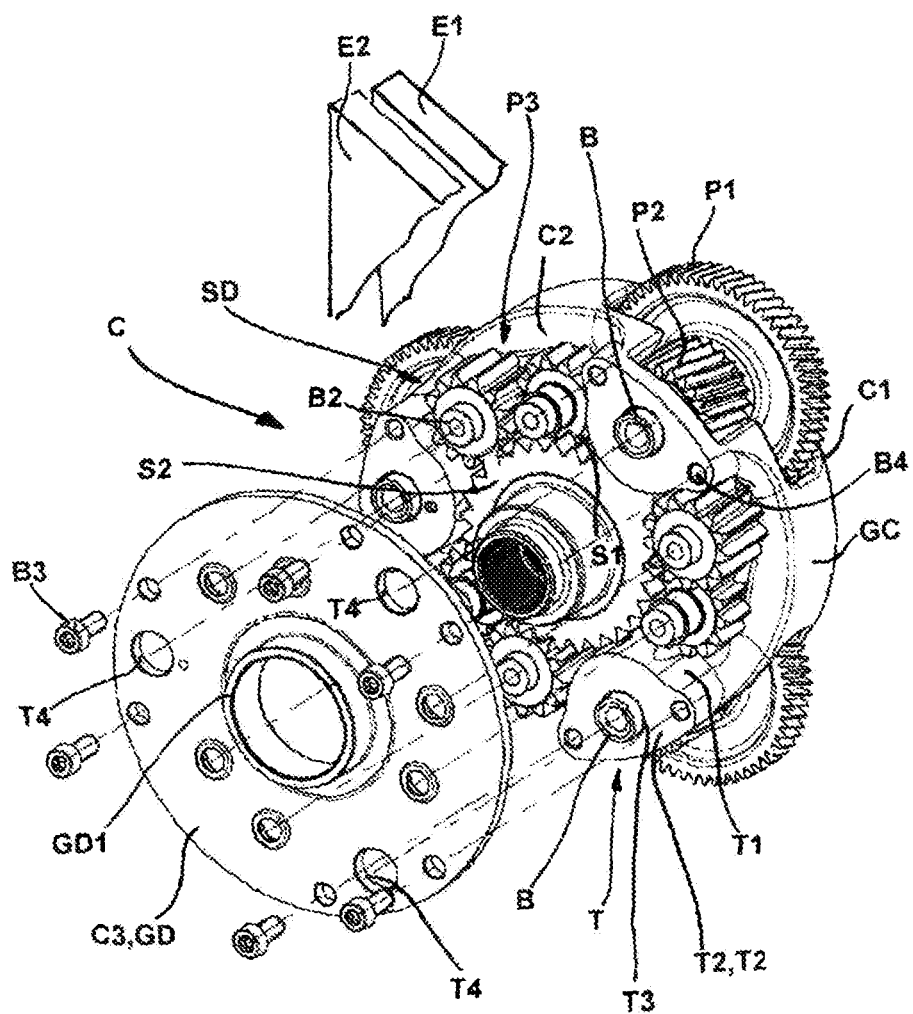
FIG. 1 shows a perspective exploded illustration for the visualization of the construction of a planetary transmission having a planetary carrier which carries a first and a second planetary arrangement in toothing planes which follow one another axially.

FIG. 1 shows one exemplary embodiment of a planetary transmission for a motor vehicle.

Said planetary transmission consists of first planets P1 which are arranged in a first planet plane E1, second planets P2 which are arranged in a second planet plane E2, and a planetary carrier C with a first carrier wall section C1 for providing a first radially supporting wall, a second carrier wall section C2 for providing a second radially supporting wall which is spaced apart axially from the first carrier wall section C1, and a third carrier wall section C3 for providing a third radially supporting wall which is in turn spaced apart axially from the second carrier wall section C2.

In the case of the planetary transmission, the first and the second carrier wall section C1, C2 are formed by way of a base part GC, and the third wall section is formed by way of a cover element GD. Here, the second carrier wall section C2 supports a plurality of pockets T which are spaced apart from one another in the circumferential direction, have in each case one pocket wall T1 which extends axially in the second toothing plane E2, and are closed off by way of radially extending pocket bottoms T2 in an end region which faces away from the first carrier wall section. One planet P2 of the second toothing plane E2 is received in the respective pocket T, and the cover element C3 is attached to the pocket bottoms T2 on cover seat faces T2' which in each case face away from the pocket interior.

The first and the second planets P1, P2 are mounted on planet journals B via needle bearings. The first carrier wall section C1, the second carrier wall section C2, the pocket walls T1 and the pocket bottoms T2 are formed by way of an integral part GC which is manufactured here from a cast material.

The respective pocket bottom T2 forms a receiving bore T3, in which a corresponding section of a planet journal B is seated with a tight fit. The respective planet journal B is of extended configuration such that, on a side which faces away from the pocket interior, it is elevated above the cover seat face T2' which is formed by way of the pocket bottom T2. The cover GD receives the projection of the respective planet journal B by way of a corresponding bore T4.

The second toothing plane E2 accommodates the components of a spur gear differential gear mechanism SD in an intermediate region which lies between the pockets T. Said spur gear differential gear mechanism comprises a planetary arrangement P3 which extends in the second toothing plane E2, and a first and a second sun gear S1, S2. The two sun gears S1, S2 are coupled to one another via the planetary arrangement P3 such that they can be rotated in opposite directions. The planets of the planetary arrangement P3 are likewise mounted via planet journals B2 on the planetary carrier C. Said planet journals B2 are seated in bores of the second carrier wall section C2 and of the third carrier wall section C3. The axial position of the second sun gear S2 is adapted in such a way that said second sun gear S2 extends at the axial level of the pocket bottoms T2. The spur gear differential SD is of a design, in the case of which profile displacement on the sun gears S1, S2 achieves a situation where the planets of the planetary arrangement P3 can be in engagement with one another at the axial level of the first sun gear S1, without the "longer" planet which engages radially from the outside into the second sun gear S2 colliding with the first sun gear S1. Reference is made to DE 10 2012 222 223 A1 which comes from the applicant with regard to said transmission concept, in particular with regard to the tooth engagement of the planets and the sun gears. One special feature of the planetary transmission which is shown here consists in that the installation space which remains within the second toothing plane E2 between the pockets T receives the components of the spur gear differential gear mechanism in the second toothing plane.

As stated above, the pocket bottoms T2 extend at an axial level, at which the sun gear S2 of the spur gear differential gear mechanism SD is situated. The cover element GD acts as an axial stop and radial bearing carrier for said second sun gear S2, and closes off the second toothing plane E2 axially.

Each of the pockets T forms a U-shaped structure in radial section. The planet P2 which is seated in said pocket is configured as a spur gear, the toothing of which is exposed in sections toward the circumferential region of the base part GC. The pocket wall T1 is guided relatively close to the radius of the planet P2. Said planet P2 engages radially from the inside into an internal gear (not shown) which extends in the second toothing plane E2. The planet P2 which is received in the respective pocket T2 is coupled fixedly via a shaft journal to a planet P1 which is arranged coaxially in the first toothing plane so as to rotate with it. Said planets P1, P2 can also be configured as single-piece multi-step planets or what are known as "long" planets which cover two toothing planes.

The cover element GD provides a bearing bore, in which a flange section of the second sun gear S2 is mounted rotatably. Said bearing bore is surrounded by a collar GD1. As is still to be seen in conjunction with FIG. 2, an anti-friction bearing L4 for radially mounting the planetary carrier C is seated on said collar GD1. Although it cannot be seen here, it is possible to provide the cover element GD with a toothing system and to realize a parking lock gear via the cover element GD.

The axial fixing of the cover element GD can be brought about via screws B3 which are screwed here into threaded bores B4 which are configured in the wall of the pockets T.

Figure 2:
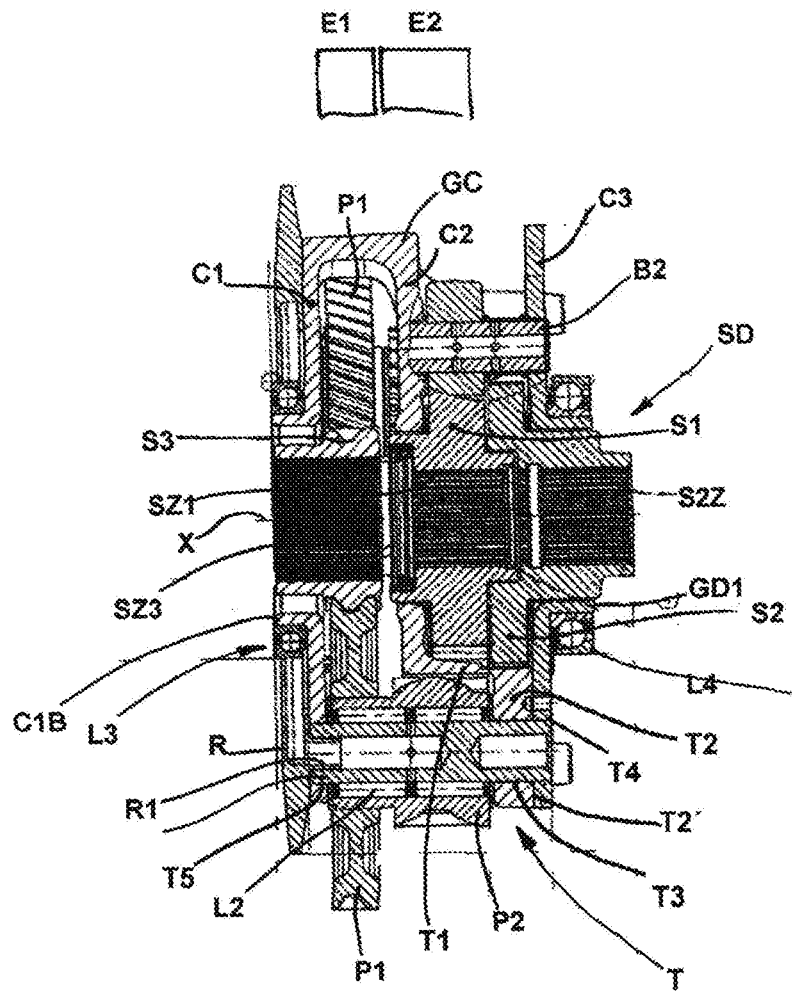
FIG. 2 shows an axial sectional illustration for the further visualization of the construction of the planetary transmission.

FIG. 2 shows the construction of the planetary transmission in axial section. As has already been stated in respect of FIG. 1, the planetary transmission comprises first planets P1 which are arranged in the first planet plane E1, second planets P2 which are arranged in the second planet plane E2, and a planetary carrier C. The planetary carrier C comprises a first carrier wall section C1 for providing a first radially supporting wall, a second carrier wall section C2 for providing a second radially supporting wall which is spaced apart axially from the first carrier wall section C1, and a third carrier wall section C3 for providing a third radially supporting wall which is spaced apart axially from the second carrier wall section C2.

The first and the second carrier wall section C1, C2 are formed by way of the base part GC, and the third wall section C3 is formed by way of a cover element GD. Here, the second carrier wall section C2 supports a plurality of pockets T which are spaced apart from one another in the circumferential direction, have in each case one pocket wall T1 which extends axially in the second toothing plane E2, and are closed off by way of radially extending pocket bottoms T2 in an end region which faces away from the first carrier wall section C1. One planet P2 of the second toothing plane E2 is received in the respective pocket T, and the cover element C3 is attached to the pocket bottoms T2 on cover seat faces T2' which in each case face away from the pocket interior.

The first and the second planets P1, P2 are mounted on planet journals B via needle bearings L2. The first carrier wall section C1, the second carrier wall section C2, the pocket walls T1 and the pocket bottoms T2 are formed by way of the integral part GC which is manufactured here from a cast material.

The planets P1 of the first toothing plane E1 are coupled in a torsionally rigid manner to the planets P2 of the second toothing plane P2. Said gearwheel structure which overlaps the two planes E1, E2 axially forms a multi-step planet. The drive of the multi-step planet is brought about via a sun gear S3 which engages radially from the inside into the planets P1 of the first toothing plane E1. The second planets P2 engage radially from the inside into a stationary internal gear (not shown) which extends in the second toothing plane E2. The pocket T which accommodates the second planet P2 is axially open toward the first planet P1. The multi-step planet which is formed from the two planets P1, P2 is supported radially on the first carrier wall C1 and in the eye of the pocket bottom T2. The spur gear differential gear mechanism SD is received in the remaining interior space of the planetary carrier between the pockets T. The sun gears S1, S2 are centered on one another and are additionally supported radially in the second carrier wall section C2 and the third carrier wall section C3. Said two carrier wall sections C2, C3 also form the axial stops for said two sun gears S1, S2 of the spur gear differential gear mechanism.

The planet journals B penetrate the pocket bottoms T2 axially with the formation of a projection section. Said projection section then engages into a locating bore of the cover GD and centers the latter with torque-proof coupling thereof to the base part GC.

The planet journals B are provided with central bores, for feeding lubricating oil into the region of the bearings L2. The feed of the lubricant takes place by way of a catcher ring R which forms a radially inwardly open catching channel which communicates via plug-in pin channels R1 with the inner region of the planet journals B. Here, the entry of lubricating oil into the planet journals B takes place by way of centrifugal effects.

The method of operation of the planetary transmission as a reduction gear mechanism with an integrated axle differential of a motor vehicle which is driven by electric motor is as follows:

The drive torque which is generated by an electric motor (not shown) is coupled into the sun gear S3 via its internal toothing SZ3. The sun gear S3 engages radially from the inside into the planets P1 and drives said planets P1. The planets P1 are mounted on the planet journals B via the needle bearings L2. The planet journals B are supported on both sides in the radial walls C1, T2 and C3 of the planetary carrier C. Here, the planetary carrier C is designed as an assembled structure; it consists of an integral part GC and the axially attached cover element C3. The planet P1 is coupled in a torsionally rigid manner to the planet P2. This is achieved by a bush section being configured on the planet P2, which bush section projects axially beyond the spur toothing of said planet P2 and supports a flat external toothing system which engages into a complementary internal toothing system of the first planet P1. The second planet P2 engages radially from the inside into an internal gear which engages around the planetary carrier C at the axial level of the second toothing plane E2. On account of the rotation of the second planet P2 relative to said internal gear, the planet P2 migrates along the inner circumference of the internal gear and drives the planetary carrier C via the planet journal B. The planetary carrier C supports a spur gear differential SD in an intermediate space between the pockets T. The kinematic coupling of said spur gear differential SD to the planetary carrier C takes place via the planet journals B2 of the spur gear differential SD. Said journals B2 are seated in bores which are configured in the middle carrier wall C2 and the cover element C3. The planets P3 of the spur gear differential SD are seated on said journals B2. A part of the planets P3 engages radially from the outside into the first sun gear S1; a further part of the planets P3 engages radially from the outside into the second sun gear S2. Said planets P3 are then coupled in pairs such that they can be rotated in opposite directions, with the result that coupling of the sun gears S1, S2 in a manner which can be rotated in opposite directions is achieved. The sun gears S1, S2 are provided with an internal toothing system S1Z, S2Z. A take-off of torque to a left hand and a right hand wheel drive shaft, or to a front axle and a rear axle, is brought about via said internal toothing systems S1Z, S2Z.

It is possible to configure the drive shaft which engages into the toothing SZ3 of the third sun gear S3 as a hollow shaft, and to guide the wheel drive shaft which engages into the toothing S1Z coaxially through said shaft. That hollow shaft which engages into the toothing SZ3 can at the same time form the rotor shaft of an electric motor which drives the sun gear S3. It is also possible, however, to design the drive of the sun gear S3 with the interconnection of other gear mechanism members, in particular traction mechanisms or spur gear drives, in such a way that the drive motor can be arranged offset radially with respect to the transmission axis X.

The planetary carrier C which is formed by way of the base part GC and the attached cover C3 is mounted on both sides via the bearings L3, L4. The bearing L3 is configured as an anti-friction bearing and is seated on a collar C1B which projects axially beyond the first carrier wall C1 on a side which faces away from the carrier wall C2. The bearing L3 is likewise configured as an anti-friction bearing and is seated on a collar GD1 which is provided by way of the cover element C3 and projects axially beyond its front face on a side which faces away from the middle carrier wall C2.

As specified above, the planetary carrier C is assembled from two main constituent parts, that is to say the base part GC and the cover element GD. The base part GC forms the two adjoining carrier walls C1 and C2 which accommodate the first toothing plane, and the pockets T which extend axially from the middle carrier wall C2 in the direction of the cover element. The structures which are called pockets here consist of an axially extending pocket wall T1 and the pocket bottoms T2. The pockets T are axially open toward the first toothing planes E1 through the middle carrier wall C2, and additionally provide a window which is open radially to the outside and through which a part of the spur gear toothing of the planets P2 is exposed radially toward the outside. The pocket bottoms T2 form a seat face T2', to which the cover element C3 is attached; in addition, the pocket bottoms form the bores (eyes) T3, in which the planet journals B are seated with a projection. The base part GC therefore acts as a complex spatial structural component which forms the two journal bores T5, T4 for the planet journals B and therefore for the double-sided mounting of the multi-step planet which is assembled from the planets P1 and P2. The cover element C3 assists the load-bearing capacity of the support of the planet journal B in the region of the pocket bottom T2, and brings about coupling of all planet journals B, B2 which protrude axially out of the second toothing plane E2. The planets P1, P2 can be inserted radially from the outside into the base part GC with the needle bearings which are already received in them; the planet journals B can then be pushed in axially through the bores T4, T5. The spur gear differential SD is attached to the middle carrier wall C2 from the side of the pocket bottoms T2. The cover element C3 is then attached to this assembly and is mounted on the base part GC via the screws B3 (see FIG. 1). The axial extent of the second toothing plane E2 is bridged by way of the structures which are designed as pockets T. The pockets therefore act as webs, as a housing of the planets P2, and as a journal carrier for supporting the planet journals B on the other side of the first carrier wall C1. The planet journals B also act as coupling members for positionally correct attachment of the cover element C3 to the base part CG. The axial level which is occupied by the bottom sections T2 of the pockets accommodates a sun gear S2 of the spur gear differential SD, which sun gear S2 lies between the pockets T, with the result that this installation space can also still be utilized.

The concept is preferably implemented in such a way that the base part GC supports three pockets T which are arranged at the same circumferential pitch. It is also particularly advantageously suitable for realization with merely two pockets T, or else four pockets T.

Within the context of the present description, the terms toothing plane or planet plane E1, E2 are to be understood to mean spatial regions, in which the respective spur gears P1, P2 are situated and are in engagement with corresponding mating gears.

They are therefore not geometrically two-dimensional regions, but rather spaces, the height of which corresponds substantially to the axial length of the toothing region of the planets P1, P2. Here, the second toothing plane E2 also comprises the region of the second sun gear S2, the toothing of which extends approximately at the axial level of the pocket bottoms T2. The sketches in respect of said planes which are incorporated in FIGS. 1 and 2 serve merely for visualization, and their axial extent does not correspond exactly to the geometric conditions which actually exist in the case of said exemplary embodiment.

The coupling of the first carrier wall section C1 to the second (that is to say, the middle) carrier wall section C2 takes place firstly by way of cylinder walls which extend along the outer circumference of said carrier wall sections between the circumferential regions which are taken up by the toothing of the planets P1. The planets P1 can likewise be housed by a pocket wall in the radius of the first carrier wall section C1, which pocket wall forms windows of sufficiently great dimensions merely in the engagement region with the sun gear S3.

The invention claimed is:
1. A planetary transmission, comprising:
first planets which are arranged in a first planet plane;
second planets which are arranged in a second planet plane;
a plurality of planet journals, each journal supporting one first planet and one second planet; and
a planetary carrier which is provided for circulation about a transmission axis with a first carrier wall section, a second carrier wall section which is spaced apart axially from the first carrier wall section, and a third carrier wall section which is spaced apart axially from the second carrier wall section;
wherein:
the first and the second carrier wall section are formed by a base part, and the third wall section is formed by a cover element;
the second carrier wall section carries a plurality of pockets which are spaced apart from one another in the circumferential direction, each including one pocket wall which extends axially in the second planet plane in the direction of the transmission axis, and are closed off by radially extending pocket bottoms in an end region which faces away from the first carrier wall section;
each pocket bottom forms a receiving bore in which a section of one of the planet journals of the plurality of planet journals is seated;
each second planet of the second planet plane is received in a respective pocket of the plurality of pockets; and the cover element is attached to the pocket bottoms on cover seat faces which face away in each case from the pocket interior.

2. The planetary transmission of claim 1, wherein the first carrier wall section, the second carrier wall section, the pocket walls and the pocket bottoms are formed by the base part in the form of a single-piece integral part.

3. The planetary transmission of claim 2, wherein the base part is manufactured from a cast material.

4. The planetary transmission of claim 1, wherein a respective planet journal is configured to be so long that, on a side which faces away from the interior of the pocket, it is elevated above the cover seat face which is formed by the pocket bottom, and the cover element receives the projection of the planet journal by a corresponding bore.

5. The planetary transmission of claim 1, wherein the second planet plane accommodates a spur gear differential gear mechanism in an intermediate region which lies between the pockets.

6. The planetary transmission of claim 5, wherein the pocket bottoms extend on an axial level, in which a sun gear of the spur gear differential gear mechanism is situated.

7. The planetary transmission of claim 1, wherein the cover element closes off the second planet plane.

8. An integrated reduction gear and spur gear differential comprising: an integrally formed planetary carrier base part having a first carrier wall section and a second carrier wall section spaced apart axially from the first carrier wall section, wherein the second carrier wall section carries a plurality of pockets which are spaced apart from one another in a circumferential direction, each pocket having an axially extending pocket wall and being closed off by a radially extending pocket bottom; and a cover element forming a third carrier wall section and attached to the pocket bottoms on a side opposite the first carrier wall section; a plurality of planet journals each journal supporting one first planet and one second planet; each pocket bottom forms a receiving bore in which a section of one of the planet journals of the plurality of planet journals is seated; and each second planet of the second planet plane is received in a respective pocket of the plurality of pocket.

9. The integrated reduction gear and spur gear differential of claim 8 wherein the base part is manufactured from a cast material.

10. The integrated reduction gear and spur gear differential of claim 8 further comprising: a plurality of first planets arranged in a first planet plane; and a plurality of second planets arranged in a second planet plane, each second planet received in the respective pocket of the plurality of pockets and fixedly coupled to a respective one of the first planets.

11. The integrated reduction gear and spur gear differential of claim 10 further comprising the plurality of planet journals wherein each first and second planet is mounted on the planet journal between the first carrier wall section and the respective pocket bottom and wherein each planet journal extends through the respective pocket bottom into the respective bore in the cover element.

12. The integrated reduction gear and spur gear differential of claim 10 further comprising:
a first sun gear in the first gear plane and meshing with each of the first planets; and
an internal gear in the second gear plane held against rotation and meshing with each of the second planets, thereby forming a reduction gear between the first sun gear and the base part.

13. The integrated reduction gear and spur gear differential of claim 10 further comprising:
a second sun gear and a third sun gear in the second gear plane;
a plurality of third planet gears each located circumferentially between two of the pockets, each supported for rotation with respect to the base part, and each meshing with the second sun gear; and
a plurality of fourth planet gears each located circumferentially between two of the pockets, each supported for rotation with respect to the base part, and each meshing with the third sun gear and one of the third planet gears, thereby forming a spur gear differential.

14. The integrated reduction gear and spur gear differential of claim 13 further comprising a shaft fixedly coupled to the third sun gear and radially supported by a bearing bore defined within the cover.

* * * * *